(12) United States Patent
Blankenstein et al.

(10) Patent No.: US 7,931,868 B2
(45) Date of Patent: Apr. 26, 2011

(54) DEVICE FOR THE MANIPULATION OF LIMITED QUANTITIES OF LIQUIDS

(75) Inventors: Gert Blankenstein, Dortmund (DE); Ralf-Peter Peters, Bergisch-Gladbach (DE); Holger Bartos, Dortmund (DE)

(73) Assignee: Steag Microparts GmbH, Dortmund (DE)

( * ) Notice: Subject to any disclaimer, the term of this patent is extended or adjusted under 35 U.S.C. 154(b) by 1057 days.

(21) Appl. No.: 10/864,359

(22) Filed: Jun. 10, 2004

(65) Prior Publication Data
US 2005/0026346 A1    Feb. 3, 2005

(30) Foreign Application Priority Data
Jun. 13, 2003    (DE) .................................. 103 26 607

(51) Int. Cl.
*B01L 3/00* (2006.01)
*H01L 21/8238* (2006.01)
(52) U.S. Cl. .......................................... 422/99; 438/200
(58) Field of Classification Search ............... 422/99; 438/200
See application file for complete search history.

(56) References Cited

U.S. PATENT DOCUMENTS

| | | | | |
|---|---|---|---|---|
| 5,707,799 A | * | 1/1998 | Hansmann et al. | 435/6 |
| 6,156,270 A | * | 12/2000 | Buechler | 422/58 |
| 6,296,126 B1 | * | 10/2001 | Peters | 210/456 |
| 6,368,871 B1 | | 4/2002 | Christel et al. | |
| 6,451,264 B1 | | 9/2002 | Bhullar et al. | |
| 2002/0055167 A1 | | 5/2002 | Pourahmadi et al. | |

FOREIGN PATENT DOCUMENTS

| | | |
|---|---|---|
| DE | 10110589 | 9/2002 |
| DE | 10134362 | 1/2003 |
| JP | 03-223674 | 10/1991 |
| JP | 2001526778 | 12/2001 |

* cited by examiner

*Primary Examiner* — Lore Jarrett
(74) *Attorney, Agent, or Firm* — Welsh Flaxman & Gitler LLC

(57) ABSTRACT

Device for manipulation of limited quantities of liquids with the following features:
- the device has at least one solid;
- the solid has surface areas in which different capillary forces act;
- one or more first surface areas have a microstructured and/or nanostructured surface;
- the microstructured and/or nanostructured surfaces have regularly arranged structure elements (A to E);
- the solid and the structure elements consist of one material and are connected to one another in one piece;
- one or more first surface areas are provided with reagents;
- the second surface area encompasses at least one of the first surface areas.

41 Claims, 2 Drawing Sheets

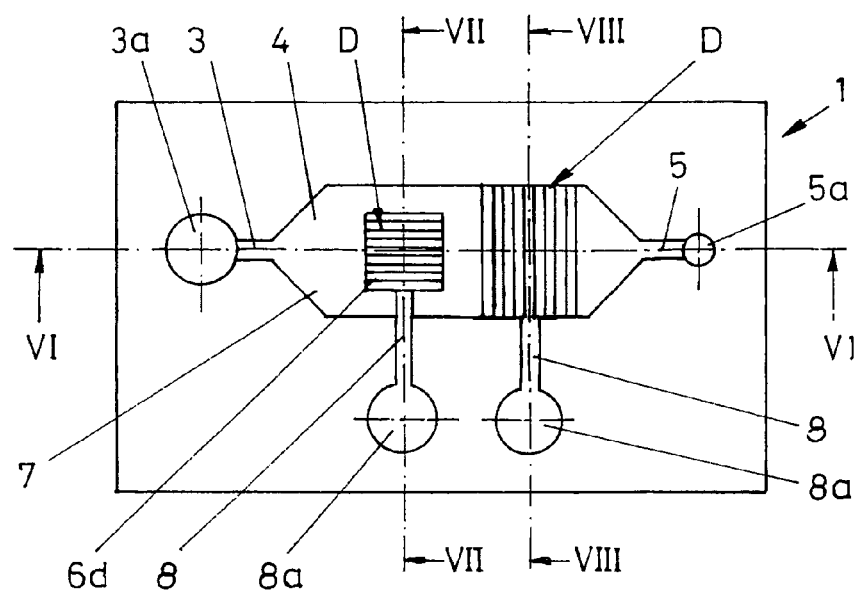
Fig. 5
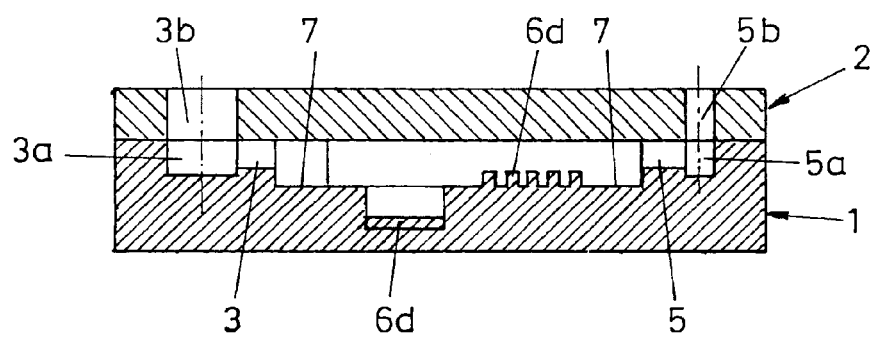
Fig. 6
Fig. 7
Fig. 8
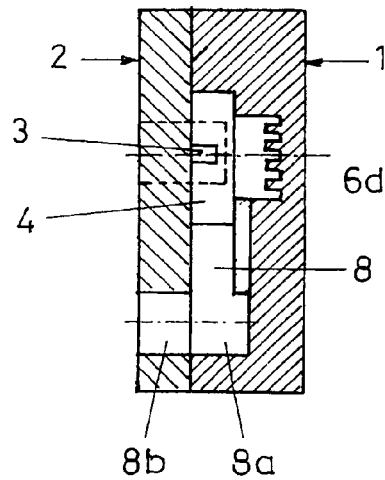
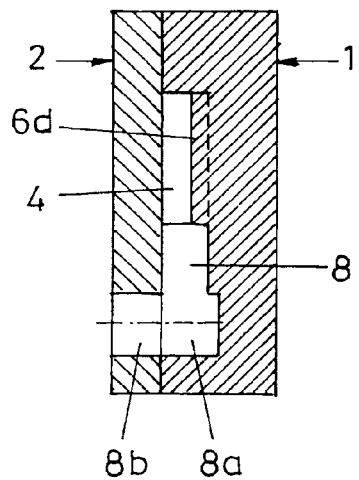

DEVICE FOR THE MANIPULATION OF LIMITED QUANTITIES OF LIQUIDS

BACKGROUND OF THE INVENTION

This invention relates to a device for manipulation of liquids and a process for producing and using such a device.

Document WO 02/085520 A2 discloses a body which has a surface which has first and second surface areas which have different wettability with a liquid. The surface areas can, for example, be hydrophilic on the one hand and hydrophobic on the other hand. It is possible for the surface areas to be lipophilic or lipophobic with respect to oily solutions. In this publication, two processes for producing different surface areas are named. Thus, on the one hand the different wetting properties can be achieved by coatings. These coatings can be attained by lithographic processes with subsequent coating steps. On the other hand, the different wetting properties can be attained by microstructuring, as is the case in the so-called lotus effect which is based on different roughnesses of the surface. These different roughnesses can be obtained by microstructuring of the corresponding surface areas. Within the microstructured areas, capillary forces act which keep the liquids in these surface areas. The publication, as an example for producing a microstructure, names a chemical treatment, or ion irradiation.

If microstructuring is produced by chemical treatment, etching is possible, or by ion irradiation, an irregularly structured surface is formed in the generic solids. The surface cannot be exactly acquired by computations.

Therefore, it is difficult to exactly specify the acting capillary forces. But if surface areas with different capillary forces are to be produced, it is advantageous to know exactly the acting capillary forces of each surface area and to produce surface areas with desired capillary forces.

Another problem with the microstructures produced by the known processes is that the acting capillary forces which keep the liquid in one of the surface areas and which thus also dictate the amounts of liquid which can be stored in the surface area are relatively small. Thus only a relatively small amount of liquid can be deposited in the microstructured surface area.

The publication, with the publication number U.S. Pat. No. 6,451,264 B1, discloses a device with which liquids are routed through curved capillary channels to different chambers in which the liquid can be tested for certain reactions. In the device, there are dry reagents which are suitable for this purpose. The dry reagents should be located in the chambers in which the liquid is tested.

In the curved capillary channels, the phenomenon occurs that the liquid on the wall with the smaller radius is conveyed more rapidly than the opposing channel wall with the larger radius. Uniform motion of the liquid through the curved channels is therefore conventionally not possible. In order to remedy this problem, in the indicated publication, it is proposed that microstructured surfaces with regularly arranged structure elements be placed in the curved channel; these elements ensure uniform motion of the liquid in the curved channels. If a liquid reaches such a microstructured surface area in the curved channel, first this microstructured surface area is filled with liquid. Only when the microstructured surface area is completely filled with liquid do the transport forces cause the liquid in the transport direction to emerge again from the microstructured surface area. Transport along the channel wall with the smaller radius which is more rapid than the transport of the liquid along the channel wall with the larger radius is thus prevented. The liquid is transported uniformly through the curved channel.

The microstructured surface areas in the curved channels of the device, according to the indicated publication, are thus not suited or intended for storing or depositing a liquid. The purpose of the microstructured surface areas is to ensure uniform motion of the liquid in the curved channel. The device, as is known from the publication with the publication number U.S. Pat. No. 6,451,264 B1, is not suited for manipulation of liquids in the sense of this invention, especially not for storage or deposition of defined amounts of liquid.

The document, with publication number U.S. Pat. No. 6,368,871 B1, discloses a device which has a surface area in which microstructure elements are located. This surface extends in a widened point of a channel from the one channel wall to the opposing channel wall. The structures are used to filter a certain substance out of the liquid flowing through the channel in order to extract or concentrate it (column 7, line 40 to line 57). The microstructure elements of the surface area in the channel are neither suited nor intended to store or deposit defined amounts of liquid. Nor is storage of defined amounts of reagents in the surface areas known.

A device for manipulation of liquids has a solid. This solid has, as is already known, surface areas in which different capillary forces are acting. One or more first surface areas have a microstructured and/or nanostructured surface which have regularly arranged structure elements. The structure elements are connected in one piece to the remaining solid and consist of the same material as the remaining solid.

The regularly arranged structure elements in the first surface area, or in the first surface areas, produce capillary forces which provide for the liquid's remaining in the first surface area. The action of the capillary forces is so great that the liquid which touches the edge of the first surface area is sucked into the first surface area by the capillary force. By the choice and the configuration of the structure elements in the first surface area, the capillary force caused by the structure elements can be set. Setting can take place by trying out various geometries or by concerted calculation of the capillary force of the geometries. The defined capillary force of the first surface areas makes it possible to store or deposit a defined amount of liquid in the first surface areas. Thus, for example, defined amounts of one or different reagent liquids can be deposited and immobilized in the surface areas, for example dried up. This ensures that a defined amount of the reagent is located in the first surface area. Later a second amount of liquid, for example, a sample liquid, can be delivered onto the first surface area, this second amount of liquid also being limited, i.e. being defined, by the known capillary force of the first surface area.

One or more first surface areas can be provided with one or different agents. The reagents can be stored between the structure elements. Furthermore, it is possible for the reagents to be encapsulated in particles, these particles being plastic particles or magnetic particles. Likewise, it is possible for the second surface areas to be provided with reagents.

The reagent or the reagents can be stored in a resuspendable manner in the first surface area or areas. To do this, the reagents can be moved in liquid form by means of a pipette onto the first surface areas of the device. Then the reagents are dried up. The reagents are not covalently coupled to the surface, but can be resuspended over suitable liquids.

The reagents can then be resuspended, for example, by a sample (liquid material for analysis). To do this, the sample can be moved directly onto the first surface areas or can be routed via a channel system, especially via a channel system of capillary channels, to the first surface areas from an inlet. The reagents are dissolved and mobilized by contact with the sample. In this way, they can react with the sample. The reagents which have been dried up in the first surface area and which are also called dry chemicals or dry reagents because of this drying up, can be suited to detection of a certain component of the sample. The dry chemicals can be used to make the components of the sample visible. This can take place by simple dyeing or by conventional enzymatic chemoluminometric indicator reactions. The reaction can then be analyzed, for example, by photometric studies or with the naked eye. In addition to the indicated optical processes, electrochemical analysis processes can also be used, for example, by electrodes in the device.

The reagents can also be permanently stored in the first surface areas of a device as described in the invention. The reagents can then be used as biochemical probes, the substance present in a sample liquid which has been dispensed onto the first surface areas being bound in a concerted manner to these biochemical probes; this enables detection of the substance. The reagents stored permanently in the first surface areas are not resuspended by the sample liquid. The reagents are inserted rather securely in the surface of the first surface areas. The substances which are present in the sample liquid react with these stored reagents. The reaction product cannot be washed out. Rather the reaction product must be examined at the location of the first surface areas, for example, by optical processes.

A device as claimed in the invention can be produced for example by the following process. First, in the surface of the solid, surface areas are produced by working (for example, metal cutting, laser working or ion beam working) of the solid, in the surface areas at least partially different capillary forces acting. In the first surface areas during working microstructured and/or nanostructured surfaces are produced and are formed by regularly arranged structure elements. Likewise, it is possible to mold the microstructures of the first surface areas in the production of the solid, for example, by injection molding (microinjection molding) into the surface of the solid. A solid then advantageously consist of a plastic. But it is also possible to produce the solid of a device from glass or silicon.

In the device, there can be second surface areas which are made preferably flat, i.e. without microstructuring or nanostructuring. In the second surface areas preferably compared to the first surface areas in any case low capillary forces are acting so that a liquid is preferably stored in the first surface areas or is preferably taken up by the first surface areas.

In the first surface areas of a device capillary forces of different size can act.

The structure elements of a device which are intended for microstructuring and/or nanostructuring of the first surface areas can comprises columns and/or stelae. These columns can have a diameter from 0.1 to 500 microns. The distance from column or stele to column or stele can be 0.1 to 500 microns.

The columns or stelae can have a circular or polygonal cross section. The diameter of the columns or stelae is advantageously 0.1 to 500 microns.

The structure elements can furthermore comprise grooves which preferably have a width from 0.1 to 500 microns and a depth from 0.1 to 500 microns. The grooves are preferably arranged in parallel, have a distance from 0.1 to 500 microns from one another and are preferably 0.1 to 500 microns deep. The grooves can be straight or circular. It is possible for the grooves to have a notch-like cross section. The grooves can be joined to one another and form a channel structure, for example, a net-like or meandering channel structure.

Moreover, it is possible for there to be crosspieces as structure elements in the device. These crosspieces can have a width from 0.1 to 500 microns and a height from 0.1 to 500 microns. Advantageously, the crosspieces have a distance from 0.1 to 500 microns and are arranged in parallel to one another.

In a lowered first surface area, the structure elements can also be notches which are made in the edge of the lowered surface area. These notches are, for example, known from document U.S. Pat. No. 6,296,126 B1, FIG. 6, reference number 17 as means for overcoming a capillary stop.

In the device, one or more first surface areas are lowered or elevated relative to the surrounding surface. Such a sudden change of the surface properties and the resulting large capillary force, similarly to a capillary stop, lead to a capillary jump which clearly delimits the elevated or lowered surface areas.

The first surface areas can be arranged in the form of a matrix, the first surface areas being surrounded in part or preferably completely by the second surface area. The first surface areas can be located especially also in a chamber of the device which has an inlet and an outlet so that a sample liquid can flow through the chamber. The first surface areas can then be located both next to one another and also in succession in one or more rows in the chamber, each first surface area being surrounded by the second surface area.

The first surface areas of a device can be functionalized before applying the reagents by plasma processes such as, for example, plasma polymerization or wet chemical processes. In this way, the amount of reagent which is to be stored in the first surface area can be increased.

In one preferred version of a device, one section of the continuous first and/or second surface areas is lowered relative to the surrounding surface. This continuous section can then be closed with a cover, and the cover can be formed by a second solid which can be made like the first solid, and the space located between the section and the cover forming a reaction chamber. If the second solid is made similarly to the first solid, it preferably has first surface areas which are located advantageously opposite to the first surface areas of the first solid.

Such a device can then have a first inlet. This inlet then advantageously comprises an inlet channel which discharges into the reaction chamber, an inlet chamber and/or an inlet opening in the cover or in the solid. The inlet can also discharge directly into the first surface area.

Analogously there can also be an outlet in the device. This outlet can comprise an outlet channel which begins in the reaction chamber and which advantageously adjoins an outlet chamber. This outlet chamber can then be connected to the environment via an outlet opening in the cover or in the solid.

The inlet and the outlet of a device as claimed in the invention are used on the one hand to add and remove the sample liquid. On the other hand the inlet and the outlet are also used for aeration and deaeration during transport processes in a device and especially in its reaction chamber.

In a device, there can be one or more second inlets. These second inlets, analogously to the first inlets, are equipped advantageously with inlet channels, inlet chambers, and/or inlet openings in the cover or in the solid. The inlet channels are then joined to one first surface area at a time. But it is also conceivable for the inlet channels of the second inlets to be connected to a second surface area.

In the process, after producing the first surface areas in the solid, a reagent-containing liquid can be dispensed onto the first surface areas. Different liquids can be dispensed onto different first surface areas. These liquids can then be mixed with another liquid, specifically a sample, the sample reacting with the reagents. It is possible for the reagents to be temporarily attached, for example, dried up, to the first surfaces. The reagents are then stored as a solid on the surfaces. By supplying a sample these dried-up reagents can then be dissolved. The sample then reacts with the dissolved reagents in the area of the first surface areas, on a separate reaction chamber of the device or after removal from the device outside the device. Furthermore, it is also possible for the dried-up reagents to be dissolved with a solvent in order then in the area of the first surface areas or in another area of the device to be mixed with a sample liquid in order to initiate the desired reaction.

It is possible for the reagents to be permanently attached in the first surface areas, i.e. immobilized. The reagents can be attached via a covalent bond. The sample can then be delivered onto the first surface areas for analysis. If then the substance which is to be analyzed should be present in the sample, it binds to the corresponding first surface areas. This binding reaction can be detected via a corresponding indicator reaction.

The microstructured or nanostructured surfaces of the first surface areas can be shaped in a depression of the solid. If this depression is closed with a cover, the depression forms a reaction chamber. Advantageously, there is a first inlet for this reaction chamber. Furthermore, there can also be a second inlet which is closed when a liquid with reagents is added to the device. The closing of the second inlet has the advantage that in this way the amount of liquid exactly metered with the reagents can be delivered into the device or into the reaction chamber in order to isolate it subsequently from the environment.

BRIEF DESCRIPTION OF THE DRAWINGS

Embodiments for devices as claimed in the invention are detailed using the drawings.

FIG. 5 shows an overhead view of a carrier of a third device as claimed in the invention, FIG. 6 shows a section through the second device as claimed in the invention according to line VI-VI in FIG. 5, FIG. 7 shows a section through the third device as claimed in the invention according to line VII-VII in FIG. 5, and FIG. 8 shows a section through the third device as claimed in the invention according to line VIII-VIII in FIG. 5.

DETAILED DESCRIPTION OF THE DRAWINGS

Figure 1:
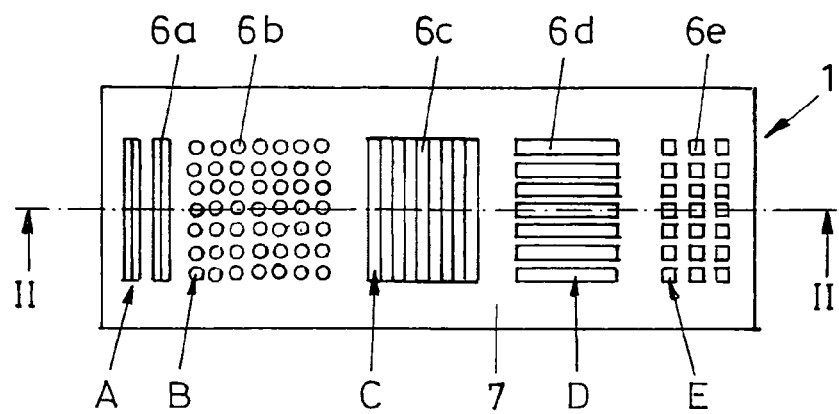
FIG. 1 shows an overhead view of a first device as claimed in the invention.
Figure 2:
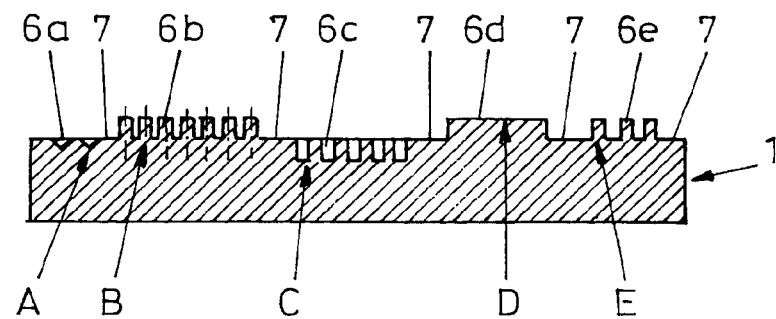
FIG. 2 shows a section according to line II-II in FIG. 1.

The device which is shown in FIGS. 1 and 2 consists of a solid which is designated the carrier 1, in the form of a cuboid. On the top of the carrier 1 there are first surface areas 6a to 6e and second surface areas 7. The first surface areas 6a to 6e are located spaced apart from one another and each of these first surface areas 6a to 6e has a shape which is rectangular in an overhead view. These first surface areas 6a to 6e of the carrier 1 have a microstructured surface. The second surface areas 7 which include the first surface areas are conversely made flat. In the areas of the first surface areas 6a to 6e greater capillary forces act than in the second surface areas 7 due to the microstructured surface in the first surface areas 6a to 6e.

For the first surface areas 6a to 6e the surfaces are microstructured in different ways. But devices for certain applications are feasible in which the surfaces are microstructured in the same way. It is common to all first surfaces 6a to 6e that the microstructured surfaces of the first surface areas 6a to 6e have regularly arranged structure elements A to E. The first surface areas 6a to 6e of the carrier 1 differ in the shape of the selected structure elements. Due to the different structure elements in the first surface areas 6a to 6e capillary forces act which are different from one another and which have a certain effect on the storage capacity of the liquids of the respective microstructured surface.

It is common to the structure elements of the first surface areas 6a to 6e that they are advantageously produced solely by mechanical working of the carrier 1, the carrier 1 consisting of a material and the structure elements not be applied by coatings or the like to the carrier 1.

In the carrier 1 as shown in FIGS. 1 and 2 there are the following structure elements A to E in the first surface areas 6a to 6e. The first structure area 6a has notch-like grooves A as the structure elements. These grooves are arranged parallel to one another in the transverse direction of the carrier 1.

Spaced apart from the first surface area 6a and separated by a second surface area 7 is the first surface area 6b. This first surface area 6b as structure elements has columns B which are arranged in a grid. These columns B have a circular cross section.

Spaced apart from this first surface area 6b and separated by a second surface area 7 is the first surface area 6c. As structure elements here there are in turn grooves C which are likewise arranged in the transverse direction of the carrier 1, but which have a rectangular cross section.

Separated by a second surface area 7 and spaced apart from the first surface area 6c is the first surface area 6d. This first surface area 6d has crosspieces D arranged in the lengthwise direction of the carrier 1 as structure elements.

Separated by another second surface area is the last first surface area 6e of the carrier 1. This first surface area 6e as structure elements has columns E which however in contrast to columns A of the first surface area 6b have a square cross section.

Figure 3:
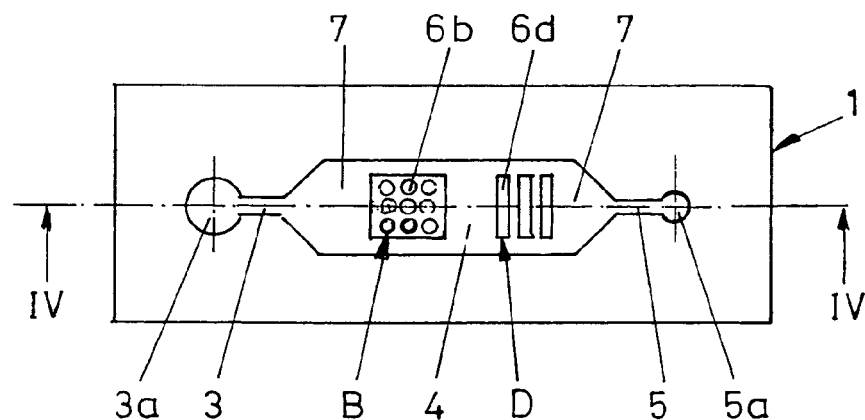
FIG. 3 shows an overhead view of a carrier of a second device as claimed in the invention.
Figure 4:
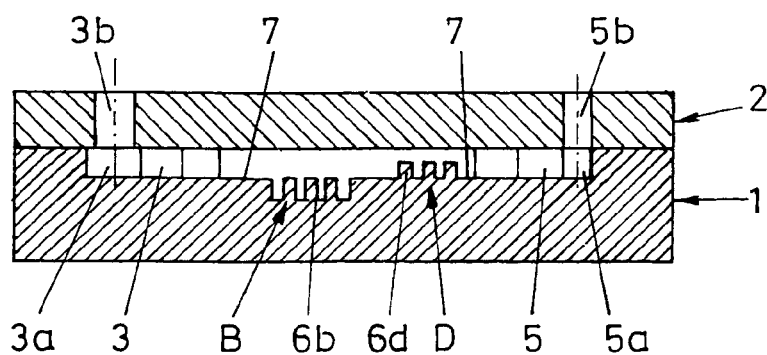
FIG. 4 shows a section through the second device as claimed in the invention according to line IV-IV in FIG. 3.

Furthermore, reference is made to FIGS. 3 and 4 which show a second device as claimed in the invention. The second device has a solid which is designated the carrier 1, and a cover 2, in FIG. 3 for the sake of better clarity only the carrier 1 being shown in an overhead view. The carrier 1 on its top has several recesses which are connected to one another and which are at least partially closed by the cover 2. In this way the recess in the top of the carrier 1 forms cavities or channels between the carrier 1 and the cover 2. One of the cavities in the second device forms a reaction chamber 4 here.

The reaction chamber 4 is connected to the environment via an inlet 3, 3a, 3b and an outlet 5, 5a, 5b. The inlet comprises an inlet opening 3b in the cover 2 which is connected to the inlet chamber 3a which is formed by a recess in the top of the carrier 1. This inlet chamber 3a is connected via an inlet channel 3 to the reaction chamber 4. The reaction chamber 4 is then connected via an outlet channel 5 to the outlet chamber 5a. From this outlet chamber 5a there is a connection to the environment via an outlet opening 5b in the cover 2.

The inlet channel 3, the reaction chamber 4 and the outlet channel 5 are made such that a liquid dispensed into the inlet 3, 3a, 3b as a result of the action of capillary forces or other transport forces such as, for example, pressure can be transported out of the inlet 3, 3a, 3b into the reaction chamber 4 and from there further in the direction of the outlet 5, 5a, 5b. The aeration and deaeration of the reaction chamber 4 which are necessary in this transport process of a liquid by or in the second device takes place via the inlet opening 3b and the outlet opening 5b in the cover 2.

The bottom of the reaction chamber 4 is formed by a section of the surface of the carrier 1. This section consists of continuous first surface areas 6b, 6d and the second surface areas 7 surrounding them. The first surface areas 6b, 6d have a microstructured surface which are formed by regularly arranged structure elements B, D. In these microstructured surfaces 6b, 6d larger capillary forces act than in the second surface areas 7 surrounding them. In this way the first surface areas 6b, 6d can be more easily wetted (hydrophilic) especially for water or aqueous solutions.

The first surface area 6b is lowered compared to the surrounding second surface areas 7. This has the advantage that a liquid which has collected in the first surface area 6b must first overcome capillary forces which prevent overflow of the liquid from the first surface area 6b on the edges of the first surface area b. The edges of the lowered first surface area 6b thus form a type of capillary stop which prevents liquid transport beyond the edges of the first surface area 6b.

There are crosspieces D which are arranged parallel to one another as structure elements in the surface area 6d of the second device.

The first surface areas 6b, 6d of the second device are otherwise treated with reagents (advantageously different reagents). This means that before the cover 2 is placed on the carrier 1, reagents are applied to the first surface areas 6b, 6d for example with a dispenser. Thereupon the reagents can be dried up in the first surface areas 6b, 6d and then the reaction chamber 4 can be closed by placing the cover 2 on the carrier 1. Via the inlet 3, 3a, 3b now a sample liquid can be delivered into the second device which as a result of capillary forces or other transport forces, for example pressure, is pulled into the reaction chamber 4 and wets the first surface areas 6b, 6d there.

The cover 2 is generally attached to the carrier 1 by welding or the like. Here it can happen especially in welding that heat-sensitive reagents which are stored in the first surface areas 6b, 6d can be damaged. A solution to this problem is however offered by the third device as is described using FIGS. 5 to 8, to which reference is made below.

The third device which is shown in FIGS. 5 to 8, like the device as shown in FIGS. 3 and 4, has a carrier 1 and a cover 2 which borders the reaction space 4 to the top. Furthermore, the third device has an inlet 3, 3a, 3b and an outlet 5, 5a, 5b like the second device, as is shown in FIGS. 3 and 4. The reaction chamber 4 is formed by a continuous section of the first surface areas 6b and the second surface areas 7. The first surface areas 6b are arranged spaced apart from one another and separated by the second surface areas 7. The first surface area 6b which is the left one in FIGS. 5 and 6 is a surface area which is lowered compared to the surrounding surface of the second surface area 7. Conversely, the first surface area 6b which is the right one in the figure is raised compared to the surrounding second surface areas 7. The two first surface areas have crosspieces D as structure elements. The crosspieces D of the left first surface area 6d are arranged parallel to one another in the lengthwise direction of the reaction chamber 4, while the crosspieces D of the first surface area which is the right one in the figure are arranged parallel to one another in the transverse direction of the reaction chamber 4.

The first surface area 6d which is the left one in the figure is spaced apart from the side walls of the reaction chamber 4, while the first surface area 6d which is the right one in the figure with its structure elements D adjoins the side walls of the reaction chamber 4 which extend in the lengthwise direction.

Both the left first surface area and the right first surface area are connected to the environment of the third device via second inlets 8, 8a, 8b for reagents. These second inlets have an inlet channel 8 which discharges in the first surface areas 6d. This inlet channel 8 is connected to the inlet chamber 8a which adjoins the inlet opening 8b which leads through the cover 2.

The advantage of such a third device as claimed in the invention is that after placing the cover 2 on the carrier 1, via the inlet openings 8a of the second inlets 8, 8a, 8b reagents can be dispensed into the third device. They are transported for example as a result of capillary forces to the first surface areas 6b where they are uniformly distributed and advantageously dry up there. At a later time then a sample liquid can be delivered into the inlet opening 3b which as a result of active capillary forces is distributed over the inlet channel 3 in the reaction chamber 4.

Devices and their applications are described by way of example below:

EXAMPLE 1

One preferred embodiment of the invention relates to a microstructured device (microchip) with which a liquid can be studied. The microchip contains a fill area and an examination area with at least one microstructured first surface area which is arranged within the examination area and which is surrounded by a second surface area. The first surface area comprises essentially regularly arranged columns, crosspieces or recesses and allows storage of dry chemicals (for example as indicators) which are used generally as detection reagents by application (spotting) of a liquid with the dissolved reagent (chemical, enzyme, antibody, nucleic acid, particle coated with chemicals and the like) and its subsequent drying.

In one preferred embodiment of the microchip the surface of the first surface areas is continuously hydrophilic. When a liquid droplet or a defined amount of liquid was applied by means of a pipette or dispenser to an unstructured part of the chip surface, for example the second surface, the liquid droplet ran irregularly and uncontrolled and the reagent was not uniformly dried up and immobilized or absorbed on the surface. This would result in that the following test would be less precise.

In this embodiment, the liquid droplet or the liquid amount with the reagent dissolved therein however after application by means of a dispenser or a pipette remains within the limits of the structured first surface area. This results in that the reagent is dried up and stored only in the geometrical area which is defined by the surface structuring. Thus the location of any such spot can be accurately predicted; this simplifies the automated readout of the spot which is typically used in array technology by means of an optical scanner.

By applying a host of chemicals to a host of these structured surface areas a so-called array test chip can be devised in this way. To do this, following the spotting the structured side of the microchip is closed with a cover (adhesive film, plastic plate, glass plate, etc.) except for an inlet and an outlet.

For analysis of a sample liquid the sample is routed via the inlet into the examination chamber where individual sample components can react with the different spots.

The microchip is suited for applications and tests of liquids which contain biomolecules such as nucleic acids and proteins.

EXAMPLE 2

Immobilization of Streptavidin

To immobilize streptavidin the microstructured first surface areas of the microchip according to example 1 are coated with streptavidin. To do this, by means of a laboratory dispenser (GeSiM) 0.1 µl streptavidin solution (1 µg/ml in 0.1 M phosphate buffer, pH 7.0) is applied to the individual microstructured first surface areas and dried up. Then the excess, unbound streptavidin is removed by washing with 0.1 M phosphate buffer, pH 7.0. In order to increase the amount of streptavidin bound to the surface, the first surface areas before spotting can be functionalized by for example plasma processes such as plasma polymerization or wet-chemical processes.

For analysis purposes the fluorescein-biotin sample is applied to the entire chip surface in different concentrations (1.0 µM in PBS) and removed by a washing buffer after an incubation time of 30 seconds. The chip can then be optically measured under a fluorescence microscope or fluorescence reader at 485/525 nm (Virtek reader), the fluorescence intensity correlating with the concentration of fluorescein-biotin.

EXAMPLE 3

Production of an Antibody Microarray

In an antibody microarray antibodies in high density are applied to the first surface areas of the plastic plate (solid) and immobilized. The plastic plate is connected after immobilization of the antibodies to a second plastic plate with a channel structure (channel plate) so that via its channel structure from the outside liquids can be routed over the first surface areas. For detection of antigens in the sample liquids, to do this the sample (for example, cell lysate) is routed via the inlet and the channel structure into a reaction chamber 4 and its first surface areas. After a defined time interval the sample is removed from the reaction chamber by applying a washing solution. The bound antigen can be detected by supplying a suitable indicator solution.

EXAMPLE 4

Enzymatic Determination of Infectious Diseases in Urine Samples

The individual first surface areas (spots) within the reaction chamber contains reagents for enzymatic detection of leukocytes, nitrite, albumin, occult blood and creatinine. In the presence of the corresponding analysis targets in the liquid sample a color change takes place in the test areas and it can be analyzed as in a test strip with the naked eye and color scale or with photometric tests.

EXAMPLE 5

Determination of Chorion Gonadotropin (hCG) in Urine (Sandwich Immunoassay)

A defined amount of a urine sample is placed with a pipette in the inlet of the device, from where it flows via capillary action into a central channel and in doing so in a resuspension area of a reaction chamber with a dried up, stain-marked antibody against hCG which is present in the first surface area absorbs and dissolves. hCG present in the urine sample binds to the hCG antibodies which are dissolved in the urine sample.

The hCG-bound antibodies and unbound antibodies flow by capillary force farther into one test area of the reaction chamber. In the test area there are likewise first surface areas. These first surface areas contain immobilized hCG antibodies of the second type which are specific to another epitope of the hCG hormone and cannot be resuspended. They bind to the possibly present hCG to which the first antibodies have already been bound. This yields a fixed, sandwich-like molecule complex.

Via a washing stage the unbound antibodies present in the first reaction chamber are removed and the bonding, or the detection of hCG, is ascertained via color formation. The presence of hCG in the sample can be detected for example qualitatively with the naked eye via coloring of the test area.

EXAMPLE 6

Determination of Glucose in Blood Plasma

Chemiluminometric determination of glucose in plasma is described below, glucose being enzymatically converted via glucose oxidase catalytically into gluconic acid. The hydrogen peroxide which is formed here among others reacts in the presence of a peroxidase in a light-producing reaction with luminol. In doing so luminol is oxidized to 3-aminophthalate, light in the blue wavelength range (425 nm) being emitted. The intensity of the emitted light is proportional here to the glucose concentration and can be measured via conventional photosensitive sensors such as photomultipliers or photodiodes.

The reagent or the reagents are present in dried form in the first surface areas in the resuspension area of the device. For this purpose, the first surface areas of the device are pretreated accordingly. Conventionally, via dispenser technology the complex-forming reagent is applied in liquid form to the surface of the resuspension area and then dried. To do this, pipette stations or standard laboratory robots (for example Biomek from Beckman Coulter) can be used which allow pipetting of extremely small volumes in the microliter range. The first surface areas are made such that the applied liquid wets exclusively the first surface areas and does not flow on the surrounding second surface area into the bordering channels or cavities. In this example as the reagent 1 µl of a mixture of glucose oxidase (100 U/µl), microbial peroxidase Arthromyces ramosus (200 U/µl) and luminol (10 mM) in the resuspension area was applied and dried.

After sealing or covering the resuspension area which comprises the structured first surface area with, for example, an adhesive film the device is serviceable and can be filled with the corresponding sample. It is also possible here to apply the reagent as a solid, for example lyophilizate, powder, pellet, tablet, plastic particle (beads) etc. into the cavities which are provided for this purpose on the chip.

As a sample 2 µl $K_2$EDTA blood or blood plasma were dispensed with a pipette into the inlet of the device from where the blood sample is transported via capillary forces into a transport channel, through the resuspension area and from there into an incubation section. While the sample is flowing through the resuspension area the dry chemical is partially dissolved and mixed with the sample. The incubation section is used to set a reaction time which is predefined in terms of time between the chemical and the sample. The reaction time is the time interval which the sample needs to flow completely through the incubation area. The reaction time can be precisely set over the capillary cross section of the incubation area and its surface properties. The sample which has been pretreated in this way finally flows into a collecting channel where the resulting light signal is measured by a photomultiplier which rests externally on the transparent cover.

The invention claimed is:

1. A device for manipulation of limited quantities of liquids comprising:
   the device comprises at least one solid;
   the solid has surface areas in which different capillary forces act comprising:
   a plurality of first surface areas that have a microstructured and/or nanostructured surface, and are spaced apart from each other;
   each microstructured and/or nanostructured surface has a plurality of regularly arranged structure elements that are arranged in the form of a plurality of grids, wherein all of the regularly arranged structure elements in each grid are equal in shape to each other, and further wherein the shape of all of the regularly arranged structure elements in each grid is different than the shape of all of said regularly arranged structure elements in an adjacent grid;
   the solid and the structure elements consist of one material and are connected to one another in one piece;
   the plurality of regularly arranged structure elements in each of said first surface areas are elevated relative to a second surface area surrounding said plurality of first surface areas;
   the plurality of said first surface areas are provided with reagents; and
   said second surface area is flat and encompasses and abuts all of the first surface areas on all sides, and is not extending into said first surface areas, such that each of said first surface areas is a discrete area inside said second surface area;
   the plurality of said first surface areas having higher capillary forces than the second surface area;
   at least one third surface area, wherein each of said third surface areas is completely surrounded by and is lower than said second surface area; and
   a plurality of grooves spaced apart from the plurality of first surface areas and is completely surrounded by said second surface area, wherein the grooves are connected to one another, have a notch-shape, or have a channel structure.

2. A device as claimed in claim 1, wherein the structure elements are columns and/or stelae.

3. A device as claimed in claim 2, wherein at least one of said first surface areas comprises columns and/or stelae having a diameter from 0.1 to 500 microns.

4. A device as claimed in claim 2, wherein at least one of said first surface areas comprises columns and/or stelae being a distance of 0.1 to 500 microns from one another.

5. A device as claimed in claim 4, wherein the columns and/or stelae have a diameter from 0.1 to 500 microns.

6. A device as claimed in claim 2, wherein the columns and/or stelae have a square, round, triangular or hexagonal cross section.

7. A device as claimed in claim 1, wherein the grooves have a width from 0.1 to 500 microns.

8. A device as claimed in claim 1, wherein the grooves have a distance from 0.1 to 500 microns from one another.

9. A device as claimed in claim 1, wherein the grooves have a depth from 0.1 to 500 microns.

10. A device as claimed in claim 1, wherein the structure elements comprise crosspieces.

11. A device as claimed in claim 10, wherein the crosspieces have a width from 0.1 to 500 microns and a height from 0.1 to 500 microns.

12. A device as claimed in claim 10, wherein the crosspieces have a distance of 0.1 to 500 microns from one another.

13. A device as claimed in claim 1, wherein edges of the lowered third surface areas have notches which form structure elements.

14. A device as claimed in claim 1, wherein the reagents contain particles which are embedded between two of said structure elements or in one of said structure elements.

15. A device as claimed in claim 1, wherein the first surface areas are square, round, triangular or hexagonal.

16. A device as claimed in claim 1, wherein at least one section of the first and/or second surface areas is closed with a cover which is formed by a second solid and wherein a space between the one section and the cover forms a reaction chamber.

17. A device as claimed in claim 16, wherein the device has a first inlet.

18. A device as claimed in claim 17, wherein the first inlet has an inlet channel which discharges into the reaction chamber.

19. A device as claimed in claim 17, wherein the first inlet comprises an inlet chamber.

20. A device as claimed in claim 17, wherein the first inlet has an inlet opening in the cover or in the solid.

21. A device as claimed in claim 1, wherein the device has an outlet.

22. A device as claimed in claim 21, wherein the outlet comprises an outlet channel which begins at the reaction chamber.

23. A device as claimed in claim 21, wherein the outlet comprises an outlet chamber.

24. A device as claimed in claim 21, further including a cover, wherein the outlet comprises an outlet opening in the cover or in the solid.

25. A device as claimed in claim 1, wherein the device has one or more second inlets.

26. A device as claimed in claim 25, wherein the second inlets comprise inlet channels which are connected to at least one of said the first surface areas.

27. A device as claimed in claim 25, wherein the second inlets comprise inlet channels.

28. A device as claimed in claim 25, further including a cover, wherein the second inlets comprise inlet openings in the cover or in the solid.

29. A process for producing a device,
   the device comprises at least one solid;
   the solid has surface areas in which different capillary forces act;
   a plurality of first surface areas that have a microstructured and/or nanostructured surface, and are spaced apart from each other;
   each microstructured and/or nanostructured surface has a plurality of regularly arranged structure elements that are arranged in the form of a plurality of grids, wherein all of the regularly arranged structure elements in each grid are equal in shape to each other, and further wherein the shape of all of the regularly arranged structure elements in each grid is different than the shape of all of said regularly arranged structure elements in an adjacent grid;

the solid and the structure elements consist of one material and are connected to one another in one piece;

the plurality of regularly arranged structure elements in each of said first surface areas are elevated relative to a second surface area surrounding said plurality of first surface areas;

the plurality of first surface areas are provided with reagents; and said second surface area encompasses and abuts all of the first surface areas designated in said plurality of said first surface areas on all sides, and is not extending into said first surface areas, such that each of said first surface areas is a discrete area inside said second surface area;

at least one third surface area, wherein each of said third surface areas is completely surrounded by and is lower than said second surface area; and a plurality of grooves spaced apart from the plurality of first surface areas and is completely surrounded by said second surface area, wherein the grooves are connected to one another, have a notch-shape, or have a channel structure;

the at least one first surface areas having higher capillary forces than the second surface area, comprising the following steps:

producing a plurality of first elevated surface areas designated as said plurality of said first surface areas during working microstructured and/or nanostructured surfaces which are formed by regularly arranged structure elements;

further producing the shape of all of said regularly arranged structure elements in one of said first surface areas being different than the shape of all of said regularly arranged structure elements in a second of said first surface areas; and including all of the first surface areas being arranged such that each of said first surface areas is completely surrounded by a second surface area; and further wherein all of said first surface areas having a capillary force different than the capillary force of said surface area.

30. A process as claimed in claim 29, wherein reagent-containing liquids are dispensed onto the first surface areas.

31. A process as claimed in claim 30, wherein the reagents are immobilized or dried up.

32. A process as claimed in claim 30, wherein the microstructured and/or nanostructured surface is formed in a depression.

33. A process device as claimed in claim 32, wherein the depression is closed with a cover, by which the depression forms a reaction chamber.

34. A process as claimed in claim 33, wherein at least one first inlet to the reaction chamber is produced in the device.

35. A process as claimed in claim 33, wherein at least one second inlet to the reaction chamber is produced in the device.

36. A process as claimed in claim 35, wherein the second inlet is closed after adding a liquid with reagents.

37. A process for using a device as claimed in claim 1, wherein a sample is dispensed onto the first surface areas of the device.

38. A process for using a device as claimed in claim 37, wherein the sample reacts with the reagents which have been dried or immobilized on the first surface areas.

39. A process for using a device as claimed in claim 37, wherein the sample dissolves or partially dissolves the dried up reagents and the sample with the reagents is transported out of the reaction chamber.

40. A process for using a device as claimed in claim 37, wherein before feeding the sample a solvent is dispensed into the first surface areas and preferably the solvent partially dissolves or dissolves the dried up reagents and the solvent with the reagents is transported out of the reaction chamber.

41. A process for using a device as claimed in claim 37, wherein parts of the sample react with the immobilized reagents and are deposited on them.

* * * * *